(12) United States Patent
Tummalapalli

(10) Patent No.: US 7,617,312 B2
(45) Date of Patent: *Nov. 10, 2009

(54) MULTIDIMENSIONAL REPOSITORIES FOR PROBLEM DISCOVERY AND CAPACITY PLANNING OF DATABASE APPLICATIONS

(75) Inventor: Venkat Ranga Reddy Tummalapalli, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 599 days.

This patent is subject to a terminal disclaimer.

(21) Appl. No.: 10/871,074

(22) Filed: Jun. 18, 2004

(65) Prior Publication Data

US 2004/0243607 A1 Dec. 2, 2004

Related U.S. Application Data

(62) Division of application No. 09/549,824, filed on Apr. 14, 2000, now Pat. No. 6,804,714.

(60) Provisional application No. 60/129,658, filed on Apr. 16, 1999.

(51) Int. Cl.
*G06F 15/173* (2006.01)

(52) U.S. Cl. ......... 709/224; 709/223

(58) Field of Classification Search ......... None
See application file for complete search history.

(56) References Cited

U.S. PATENT DOCUMENTS

| | | | | |
|---|---|---|---|---|
| 5,245,638 A | * | 9/1993 | Gustafson | 714/47 |
| 5,375,070 A | * | 12/1994 | Hershey et al. | 709/224 |
| 5,459,837 A | * | 10/1995 | Caccavale | 709/226 |
| 5,799,286 A | | 8/1998 | Morgan et al. | |
| 5,805,885 A | | 9/1998 | Leach et al. | |
| 5,913,036 A | * | 6/1999 | Brownmiller et al. | 709/224 |
| 5,918,232 A | | 6/1999 | Pouschine et al. | |
| 5,966,139 A | * | 10/1999 | Anupam et al. | 345/440 |
| 6,003,036 A | | 12/1999 | Martin | |
| 6,006,206 A | * | 12/1999 | Smith et al. | 705/35 |
| 6,070,190 A | * | 5/2000 | Reps et al. | 709/224 |
| 6,108,700 A | | 8/2000 | Maccabee et al. | |
| 6,112,235 A | * | 8/2000 | Spofford | 709/223 |
| 6,182,136 B1 | | 1/2001 | Ramanathan et al. | |
| 6,212,515 B1 | | 4/2001 | Rogers | |

(Continued)

OTHER PUBLICATIONS

Irvin, D.R., Monitoring the Performance of Commercial T1-rate Transmission Service, IBM Journal of Research and Development, 805-814, 1991.

(Continued)

*Primary Examiner*—Patrice Winder
*Assistant Examiner*—Azizul Choudhury
(74) *Attorney, Agent, or Firm*—Hickman Palermo Truong & Becker LLP

(57) ABSTRACT

A distributed decision support system is described for use in the area of problem discovery and capacity planning for database applications. The use of data navigation, particularly drill down, roll up, and pivot for application management tasks are described. The system presents data collected from components of an application server system by various cartridges to users in a way that facilitates the identification of problems in the application server system and provides for an efficient way to do capacity planning of such systems.

32 Claims, 14 Drawing Sheets

U.S. PATENT DOCUMENTS

| | | |
|---|---|---|
| 6,301,590 B1 | 10/2001 | Siow et al. |
| 6,317,788 B1 * | 11/2001 | Richardson ............... 709/224 |
| 6,321,263 B1 | 11/2001 | Luzzi et al. |
| 6,336,138 B1 | 1/2002 | Caswell et al. |
| 6,381,635 B1 * | 4/2002 | Hoyer et al. ............... 709/207 |
| 6,453,346 B1 * | 9/2002 | Garg et al. ............... 709/224 |
| 6,484,179 B1 | 11/2002 | Roccaforte |
| 6,578,077 B1 | 6/2003 | Rakoshitz et al. |
| 7,003,560 B1 * | 2/2006 | Mullen et al. ............... 709/223 |

OTHER PUBLICATIONS

Berry, Robert F. and Hellerstein, Joseph L., A Flexible and Scalable Approach to Navigating Measurement Data in Performance Management Applications, Proceedings of the Second IEEE International Conference on Systems Management, 1-12, Jun. 1996.

Hellerstein, Joseph L., and Tummalapalli, Venkat R., Using Multidimensional Databases for Problem Determination and Planning of a Networked Application, Proceedings of the Third IEEE International Conference on Systems Management, 1-10, Apr. 22-24, 1998.

* cited by examiner

302

| Concurrent processing server | Concurrent Manager | Time Interval | Long Running Requests |
|---|---|---|---|
| ALL | ALL | ALL | 100,000 |

304

| Concurrent Processing Server | Concurrent Manager | Time Interval | Long Running Requests |
|---|---|---|---|
| CP1 | ALL | ALL | 75,000 |
| CP2 | ALL | ALL | 10,000 |
| CP3 | ALL | ALL | 15,000 |

306

| Concurrent Processing Server | Concurrent Manager | Time Interval | Long Running Requests |
|---|---|---|---|
| CP1 | STDMGR | ALL | 50,000 |
| CP1 | OEMGR | ALL | 20,000 |
| CP1 | SHPMGR | ALL | 2,000 |
| CP1 | POXCON | ALL | 2,000 |
| CP1 | RLAMGR | ALL | 1,000 |

308

| Concurrent Processing Server | Concurrent Manager | Time Interval | Long Running Requests |
|---|---|---|---|
| CP1 | STDMGR | MON1 | 41,000 |
| CP1 | STDMGR | MON2 | 4,000 |
| CP1 | STDMGR | MON3 | 5,000 |

| Concurrent Processing Server | Concurrent Manager | Time Interval | Long Running Requests |
|---|---|---|---|
| CP1 | STDMGR | MON1/DAY1 | 35,000 |
| CP1 | STDMGR | MON1/DAY2 | 5,000 |
| CP1 | STDMGR | MON1/DAY3 | 1,000 |

312

| Concurrent Processing Server | Concurrent Manager | Time Interval | Long Running Requests |
|---|---|---|---|
| CP1 | STDMGR | HR1 | 30,000 |
| CP1 | STDMGR | HR2 | 4,000 |
| CP1 | STDMGR | HR3 | 1,000 |

| Concurrent Processing Server | Concurrent program | Time Interval | Request Run Time |
|---|---|---|---|
| ALL | ALL | ALL | 30,000 |

404

| Concurrent Processing Server | Concurrent program | Time Interval | Request Run Time |
|---|---|---|---|
| CP1 | ALL | ALL | 25,000 |
| CP2 | ALL | ALL | 4,000 |
| CP3 | ALL | ALL | 1,000 |

406

| Concurrent Processing Server | Concurrent program | Time Interval | Request Run Time |
|---|---|---|---|
| CP1 | FNDCPURGE | ALL | 20,000 |
| CP1 | OECCRORD | ALL | 4,000 |
| CP1 | WSHCSHPB | ALL | 1,000 |

408

| Concurrent Processing Server | Concurrent program | Time Interval | Request Run Time |
|---|---|---|---|
| CP1 | FNDCPURGE | MON1 | 12,000 |
| CP1 | FNDCPURGE | MON2 | 4,000 |
| CP1 | FNDCPURGE | MON3 | 3,000 |
| CP1 | FNDCPURGE | MON4 | 1,000 |

| Concurrent Processing Server | Concurrent program | Time Interval | Request Run Time |
|---|---|---|---|
| CP1 | FNDCPURGE | DAY1 | 10,000 |
| CP1 | FNDCPURGE | DAY2 | 1,000 |
| CP1 | FNDCPURGE | DAY3 | 1,000 |

412

| Concurrent Processing Server | Concurrent program | Time Interval | Request Run Time |
|---|---|---|---|
| CP1 | FNDCPURGE | HR1 | 5,000 |
| CP1 | FNDCPURGE | HR2 | 4,000 |
| CP1 | FNDCPURGE | HR3 | 1,000 |

| Business Unit | Apps Resp | Time | Apps User | Data Server | Forms Server | CP Server | CPU MHZ | Memory MB | Disk Gb |
|---|---|---|---|---|---|---|---|---|---|
| TOTAL | TOTAL | TOTAL | TOTAL | TOTAL | TOTAL | TOTAL | 700 | 1200 | 400 |

| Business Unit | Apps Resp | Time | Apps User | Data Server | Forms Server | CP Server | CPU MHZ | Memory MB | Disk Gb |
|---|---|---|---|---|---|---|---|---|---|
| FINANCE | TOTAL | TOTAL | TOTAL | TOTAL | TOTAL | TOTAL | 350 | 450 | 150 |
| MKTG | TOTAL | TOTAL | TOTAL | TOTAL | TOTAL | TOTAL | 250 | 350 | 125 |
| HR | TOTAL | TOTAL | TOTAL | TOTAL | TOTAL | TOTAL | 120 | 250 | 105 |
| SALES | TOTAL | TOTAL | TOTAL | TOTAL | TOTAL | TOTAL | 080 | 150 | 20 |

506◄

| Business Unit | Apps Resp | Time | Apps User | Data Server | Forms Server | CP Server | CPU MHZ | Memory MB | Disk Gb |
|---|---|---|---|---|---|---|---|---|---|
| FINANCE | SYSAD | TOTAL | TOTAL | TOTAL | TOTAL | TOTAL | 45 | 40 | 14 |
| FINANCE | PO | TOTAL | TOTAL | TOTAL | TOTAL | TOTAL | 35 | 40 | 10 |
| FINANCE | AR | TOTAL | TOTAL | TOTAL | TOTAL | TOTAL | 15 | 10 | 04 |
| FINANCE | GL | TOTAL | TOTAL | TOTAL | TOTAL | TOTAL | 05 | 10 | 02 |

| Business Unit | Apps Resp | Time | Apps User | Data Server | Forms Server | CP Server | CPU MHZ | Memory MB | Disk Gb |
|---|---|---|---|---|---|---|---|---|---|
| FINANCE | PO | MM1 | TOTAL | TOTAL | TOTAL | TOTAL | 20 | 20 | 10 |
| FINANCE | PO | MM2 | TOTAL | TOTAL | TOTAL | TOTAL | 10 | 10 | 02 |
| FINANCE | PO | MM3 | TOTAL | TOTAL | TOTAL | TOTAL | 10 | 05 | 01 |
| FINANCE | PO | MM4 | TOTAL | TOTAL | TOTAL | TOTAL | 05 | 05 | 01 |

510

| Business Unit | Apps Resp | Time | Apps User | Data Server | Forms Server | CP Server | CPU MHZ | Memory MB | Disk Gb |
|---|---|---|---|---|---|---|---|---|---|
| FINANCE | PO | MM1 | FINSUP | TOTAL | TOTAL | TOTAL | 20 | 20 | 10 |
| MKTG | PO | MM1 | FIN1 | TOTAL | TOTAL | TOTAL | 10 | 10 | 02 |
| HR | PO | MM1 | FIN2 | TOTAL | TOTAL | TOTAL | 10 | 05 | 01 |
| SALES | PO | MM1 | FIN3 | TOTAL | TOTAL | TOTAL | 05 | 05 | 01 |

| Concurrent Program | Avg Execution time | Time Interval | Execution mode |
|---|---|---|---|
| ALL | ALL | ALL | ALL |

604

| Concurrent Program | Avg Execution time | Time Interval | Execution mode |
|---|---|---|---|
| POPRG1 | ALL | ALL | ALL |
| POPRG2 | ALL | ALL | ALL |
| OEPRG1 | ALL | ALL | ALL |
| WSHPRG2 | ALL | ALL | ALL |

606

| Concurrent Program | Avg Execution time | Time Interval | Execution mode |
|---|---|---|---|
| POPRG1 | ALL | ALL | C |
| POPRG2 | ALL | ALL | C |
| OEPRG1 | ALL | ALL | C |
| WSHPRG2 | ALL | ALL | C |

608

| Concurrent Program | Avg Execution time | Time Interval | Execution mode |
|---|---|---|---|
| POPRG1 | 1323 | DAY1 | C |
| POPRG1 | 1234 | DAY2 | C |
| POPRG1 | 1334 | DAY3 | C |
| POPRG1 | 1250 | DAY4 | C |
| POPRG1 | 1301 | DAY5 | C |

| Concurrent Program | Business Unit | # of Requests | Time |
|---|---|---|---|
| TOTAL | TOTAL | TOTAL | TOTAL |

704

| Concurrent Program | Business Unit | # of Requests | Time |
|---|---|---|---|
| TOTAL | B1 | 1600 | TOTAL |
| TOTAL | B2 | 2000 | TOTAL |

706

| Concurrent Program | Business Unit | # of Requests | Time |
|---|---|---|---|
| CP1 | B1 | 700 | TOTAL |
| CP2 | B1 | 500 | TOTAL |
| CP3 | B1 | 400 | TOTAL |

708

| Concurrent Program | Business Unit | # of Requests | Time |
|---|---|---|---|
| CP1 | B1 | 450 | MM1 |
| CP1 | B1 | 200 | MM2 |
| CP1 | B1 | 50 | MM3 |

710

| Concurrent Program | Business Unit | # of Requests | Time |
|---|---|---|---|
| CP1 | B1 | 250 | MM1/DD1 |
| CP1 | B1 | 150 | MM1/DD2 |
| CP1 | B1 | 50 | MM1/DD3 |

| Time | NCA Client | Apps Server | DB Server | NCA Client time | Apps Server time | DB Server time |
|---|---|---|---|---|---|---|
| TOTAL | TOTAL | TOTAL | TOTAL | 400 | 2500 | 100 |

804

| Time | NCA Client | Apps Server | DB Server | NCA Client time | Apps Server time | DB Server time |
|---|---|---|---|---|---|---|
| TOTAL | TOTAL | FINANCE | TOTAL | 220 | 1300 | 45 |
| TOTAL | TOTAL | MKTG | TOTAL | 110 | 700 | 35 |
| TOTAL | TOTAL | SALES | TOTAL | 70 | 500 | 30 |

806

| Time | NCA Client | Apps Server | DB Server | NCA Client time | Apps Server time | DB Server time |
|---|---|---|---|---|---|---|
| 04/99 | TOTAL | SALES | TOTAL | 30 | 250 | 14 |
| 05/99 | TOTAL | SALES | TOTAL | 25 | 125 | 10 |
| 06/99 | TOTAL | SALES | TOTAL | 15 | 125 | 06 |

808

| Time | NCA Client | Apps Server | DB Server | NCA Client time | Apps Server time | DB Server time |
|---|---|---|---|---|---|---|
| 05/99 | TOTAL | SALES | VISION | 14 | 075 | 06 |
| 05/99 | TOTAL | SALES | COMDEV11 | 06 | 030 | 02 |
| 05/99 | TOTAL | SALES | FSHP11 | 05 | 020 | 02 |

810

| Time | NCA Client | Apps Server | DB Server | NCA Client time | Apps Server time | DB Server time |
|---|---|---|---|---|---|---|
| 05/99 | .us.oracle.com | SALES | VISION | 09 | 040 | 04 |
| 05/99 | .uk.oracle.com | SALES | VISION | 04 | 025 | 01 |

| Time | Alert | Target | Target Type | Severity | SLA Violation |
|---|---|---|---|---|---|
| 03/05/99 | Req Errors | ampapps.us.oracle.com | Cmgr | Warning | 10 Creq errored |

904

| Concurrent Program | Concurrent Manager | Completion Status | # of Concurrent Requests | PL/SQL Block | Request Time |
|---|---|---|---|---|---|
| TOTAL | TOTAL | TOTAL | 3000 | - | - |

906

| Concurrent Program | Concurrent Manager | Completion Status | # of Concurrent Requests | PL/SQL Block | Request Time |
|---|---|---|---|---|---|
| TOTAL | TOTAL | Error | 10 | - | - |
| TOTAL | TOTAL | Warning | 100 | - | - |
| TOTAL | TOTAL | Successful | 2890 | - | - |

908

| Concurrent Program | Concurrent Manager | Completion Status | # of Concurrent Requests | PL/SQL Block | Request Time |
|---|---|---|---|---|---|
| TOTAL | POXCON | Error | 03 | - | - |
| TOTAL | STDMGR | Error | 02 | - | - |

910

| Concurrent Program | Concurrent Manager | Completion Status | # of Concurrent Requests | PL/SQL Block | Request Time |
|---|---|---|---|---|---|
| CP1(A1,A2) | POXCON | Error | - | begin.. | T1 |
| CP2(B1) | POXCON | Error | - | begin.. | T2 |
| CP1(B1,B2,B3) | POXCON | Error | - | begin.. | T3 |

| Forms Session | Database Session | Apps User | Database User | Forms Client Time | Forms Server Time | DB Time |
|---|---|---|---|---|---|---|
| TOTAL | TOTAL | TOTAL | TOTAL | 1000 | 2000 | 3000 |

1004

| Forms Session | Database Session | Apps User | Database User | Forms Client Time | Forms Server Time | DB Time |
|---|---|---|---|---|---|---|
| TOTAL | TOTAL | SYSADMIN | TOTAL | 500 | 1000 | 2000 |
| TOTAL | TOTAL | VISION | TOTAL | 300 | 700 | 800 |
| TOTAL | TOTAL | SYSADMIN | TOTAL | 200 | 300 | 200 |

1006

| Forms Session | Database Session | Apps User | Database User | Forms Client Time | Forms Server Time | DB Time |
|---|---|---|---|---|---|---|
| TOTAL | TOTAL | VISION | APPS | 150 | 400 | 500 |
| TOTAL | TOTAL | VISION | WSH | 100 | 200 | 200 |
| TOTAL | TOTAL | VISION | OE | 050 | 100 | 100 |

1008

| Forms Session | Database Session | Apps User | Database User | Forms Client Time | Forms Server Time | DB Time |
|---|---|---|---|---|---|---|
| FS1 | DS1 | VISION | APPS | 075 | 250 | 300 |
| FS2 | DS2 | VISION | APPS | 050 | 100 | 100 |
| FS3 | DS3 | VISION | APPS | 025 | 050 | 050 |

FIG. 10

MULTIDIMENSIONAL REPOSITORIES FOR PROBLEM DISCOVERY AND CAPACITY PLANNING OF DATABASE APPLICATIONS

RELATED APPLICATIONS

This application claims priority to the following previously filed applications: This application is a divisional of U.S. application Ser. No. 09/549,824, entitled MULTIDIMENSIONAL REPOSITORIES FOR PROBLEM DISCOVERY AND CAPACITY PLANNING OF DATABASE APPLICATIONS, filed on Apr. 14, 2000 now U.S. Pat. No. 6,804,714 by Venkat Ranga Reddy Tummalapalli, incorporated herein by reference, which claims priority from U.S. Provisional Patent Application No. 60/129,658, filed on Apr. 16, 1999, entitled MULTIDIMENSIONAL REPOSITORIES FOR PROBLEM DISCOVERY AND CAPACITY PLANNING OF ORACLE APPLICATIONS the content of which is hereby incorporated by reference in its entirety.

FIELD OF THE INVENTION

The present invention relates to problem discovery and, more particularly, to problem discovery and capacity planning of database applications.

BACKGROUND OF THE INVENTION

As computer systems become more complex, they become more difficult to manage efficiently, and the problems that occur within them become more difficult to isolate. One form of complex computer system on which society increasingly relies is the database system. Conventional database systems consist of one or more clients ("database applications") and a server (a "database server"). When a client requires data, the client submits a query to the server, where the query includes criteria for selecting the data. The server retrieves the data that satisfies the specified criteria from a database and returns copies of the selected data to the client that submitted the query. More complex database systems may include numerous servers that share access to one or more databases, where each such server may be serving thousands of clients.

Another type of complex computer system is known as an application server system. An application server system typically consists of one or more clients ("browsers"), a server ("application server"), and applications ("cartridges"). Users of the browsers execute the cartridges by causing the browsers to send and receive messages through the application server to the cartridges. FIG. 1 is a block diagram of an exemplary application server system 100. The system 100 includes a plurality of browsers 102, 104 and 106 that communicate with a plurality of listeners 110, 116 and 122 over the Internet 108 according to the HTTP protocol. In response to requests from the browsers, the listeners cause a web application server 180 to invoke software modules, referred to herein as cartridges. In the illustrated embodiment, web application server 180 has initiated the execution of three cartridges 130, 134 and 138.

The web application server 180 is composed of numerous components, including transport adapters 112, 118 and 124, dispatchers 114, 120 and 126, an authentication server 152, a virtual path manager 150, a resource manager 154, a configuration provider 156 and a plurality of cartridge execution engines 128, 132 and 136. A typical operation within system 100 generally includes the following stages:

A browser transmits a request over the Internet 108.

A listener receives the request and passes it through a transport adapter to a dispatcher.

The dispatcher communicates with the virtual path manager 150 to determine the appropriate cartridge to handle the request.

At this point the dispatcher does one of two things. If the dispatcher knows about an unused instance for that cartridge, the dispatcher sends the request to that instance. If there are no unused cartridge instances for that cartridge, the dispatcher asks the resource manager 154 to create a new cartridge instance. After the instance starts up successfully, the cartridge notifies the resource manager of its existence. The resource manager 154 then notifies the dispatcher of the new instance. The dispatcher creates a revised request based on the browser request and sends the revised request to the new instance.

The cartridge instance handles the revised request and sends a response to the dispatcher.

The dispatcher passes the response back through the listener to the client.

Application server systems and database systems can be combined. For example, some or all of the cartridges that are operated through the browsers in an application server system may in fact be database applications that, in turn, issue queries to one or more database servers in response to messages from the browsers. Due to the complexity of such combined systems, it is exceedingly difficult to identify the cause of performance problems. For example, assume that a browser receives an extremely slow response to a message that is sent to an application server and dispatched to a cartridge, where the message causes the cartridge to issue a query to a database server, where the database server executes the query to retrieve data for the response. Under these conditions, the slow response time may be due to problems with any of the entities involved, or with communication problems between the entities.

The identification of unacceptably slow response times may be of interest to users as well as to the administrators responsible for managing the computer system. For example, the subscription agreement of a user may guarantee a particular level of performance (e.g. that 98% of all orders be processed in less than one minute). Users with such subscriptions would typically be interested to know when, and how often, the system is not meeting the specified level of performance.

The process of ensuring that the system is able to meet the performance requirements of users is generally referred to as capacity planning. Typically, there are six general phases in the capacity planning process:

(1) setting up the service level objectives;
(2) estimating the demand for the resources of the system;
(3) identifying resources that satisfy the estimated demand;
(4) implementing the system with the identified resources;
(5) determining whether the system actually satisfies the demand; and
(6) repeating steps (2) to (5) when the system fails to satisfy the demand.

The step of determining whether the system satisfies the demand may be accomplished, for example, by periodically analyzing statistical information relating to the system. However, the amount of processing that such analysis may require can be so enormous that, if performed at a reasonable frequency, the analysis overhead itself may result in a violation of the service level commitments made to users.

The better the tools that are made available to the capacity planner, the higher the likelihood that the implemented system will satisfy the anticipated demands. Further, when the implemented system is not satisfying the anticipated demands, the easier it will be to determine and fix the problems that are preventing the achievement of the desired performance levels.

A number of systems have been developed for problem identification and planning. For example, systems for problem determination in performance management are described in B. Arinze, M. Igbaria, and L. F. Young: "*A Knowledge Based Decision Support System for Computer Performance Management*," Decision Support Systems 8, 501-515, 1992 and Bernard Domanski: "*A PROLOG-based Expert System for Tuning MVS/XA*," Proceedings of the Computer Measurement Group, 160-166, 1987. A system for process control is described in D. R. Irwin: "*Monitoring the Performance of Commercial T1-rate Transmission Service*," IBM Journal of Research and Development, 805-814, 1991. A system for planning cooking recipes is described in Janet Kolodner: "*Case-Based Reasoning*," Morgan Kaufmann Publishers, Inc., 1993. Systems for problem identification of electrical circuits and analysis of financial statements are described in Robert Milne: "*Using AI in the Testing of Printed Circuit Boards*" National Aerospace & Electronics Conference, Dayton Ohio, May 1980, and Donald W. Kosy and Ben P. Wise: "*Self-Explanatory Financial Planning Models*," Proceedings of the National Conference on Artificial Intelligence, 176-181, 1984. However, none of these systems address the domain of systems management, nor do they consider problem discovery and capacity planning.

An attempt to apply multidimensional database technology to systems management, which focuses on performance management for data from a single source, is described in Robert F. Berry and Joseph L. Hellerstein: "*An Flexible and Scalable Approach to Navigating Measurement Data in Performance Management Applications*," Proceedings of the Second IEEE International Conference on Systems Management, June, 1996. Another attempt to use multidimensional navigation for sales/subscription handling is described in Business Objects: A. M. Burgeat and F. Prabel, "*Data Warehousing: Delivering Decision Support to the Many*," Business Objects Corporation, 1996.

Based on the foregoing, it is clearly desirable to provide techniques that allow problems within complex computer systems to be isolated, and to assist in planning such systems to comply with user requirements, and to maximize system capacity and avoid bottlenecks.

SUMMARY OF THE INVENTION

Techniques are provided for facilitating database application management and, more specifically, for facilitating problem discovery and planning where the data being collected is from a plurality of data sources with a wide variety in type of instrumentation and a variety of data access components. In certain embodiments, the data access components include ROLAP/MOLAP clients. Use of the techniques described herein may reduce maintenance costs for database application systems, either in a conventional deployment scenario, or in a data center hosting scenario.

According to one aspect of the invention, techniques are provided for monitoring performance of an application server system, where the techniques involve collecting performance data from components of the application server system and storing the performance data as multidimensional data organized according to a plurality of dimensions within one or more database systems. One dimension of the plurality of dimensions is a hierarchical time dimension. Another dimension of the plurality of dimensions is a component dimension. An interface is presented for accessing and navigating through the multidimensional data within at least one of the one or more database systems. Drill down operations may be performed into one or more hierarchical dimensions of the plurality of dimensions in response to user input received through the interface.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A and 3B illustrate a series of screens that may be presented in response to navigation commands sent by a user in one scenario that uses an embodiment of the invention;

FIGS. 4A and 4B illustrate a series of screens that may be presented in response to navigation commands sent by a user in another scenario that uses an embodiment of the invention;

FIGS. 5A and 5B illustrate a series of screens that may be presented in response to navigation commands sent by a user in another scenario that uses an embodiment of the invention;

FIG. 6 illustrates a series of screens that may be presented in response to navigation commands sent by a user in another scenario that uses an embodiment of the invention;

FIG. 7 illustrates a series of screens that may be presented in response to navigation commands sent by a user in another scenario that uses an embodiment of the invention;

FIG. 8 illustrates a series of screens that may be presented in response to navigation commands sent by a user in another scenario that uses an embodiment of the invention;

FIG. 9 illustrates a series of screens that may be presented in response to navigation commands sent by a user in another scenario that uses an embodiment of the invention;

FIG. 10 illustrates a series of screens that may be presented in response to navigation commands sent by a user in another scenario that uses an embodiment of the invention.

DETAILED DESCRIPTION OF THE PREFERRED EMBODIMENT

A method and apparatus for problem discovery and capacity planning for an application server system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Techniques are provided that allow efficient, performance monitoring, service level troubleshooting, and capacity planning for an application server system. In general, the techniques involve capturing performance data from components of the application server system, and storing the data as multi-dimensional data within one or more data repositories. One of the dimensions used to organize the multi-dimensional data is time. Various tools may be used to selectively access and display the multi-dimensional data, and to perform drill-down operations to identify performance problems and perform capacity planning.

For performance monitoring, performance snapshots are taken over time. The performance snapshots indicate whether all of the performance elements are operating within bounds, and that the service level agreements are being satisfied. In one embodiment, the snapshots are stored in a historical database. Such databases are commonly referred to as data warehouses. A first performance snapshot is identified as a baseline snapshot against which subsequent performance snapshots are compared. When subsequent snapshots deviate from the baseline snapshot by a predetermined deviation threshold, a report is generated.

For service level troubleshooting, the techniques allow application service providers to track where their resources are going. Application providers use tools that allow drill down operations to track down the cause of performance problems encountered by specific users.

For capacity planning, the techniques allow administrators to quickly and efficiently answer questions like: "I have added two business units this quarter. I plan to add four more business units next quarter. How many servers will I need to buy?"

System Overview

Figure 1:
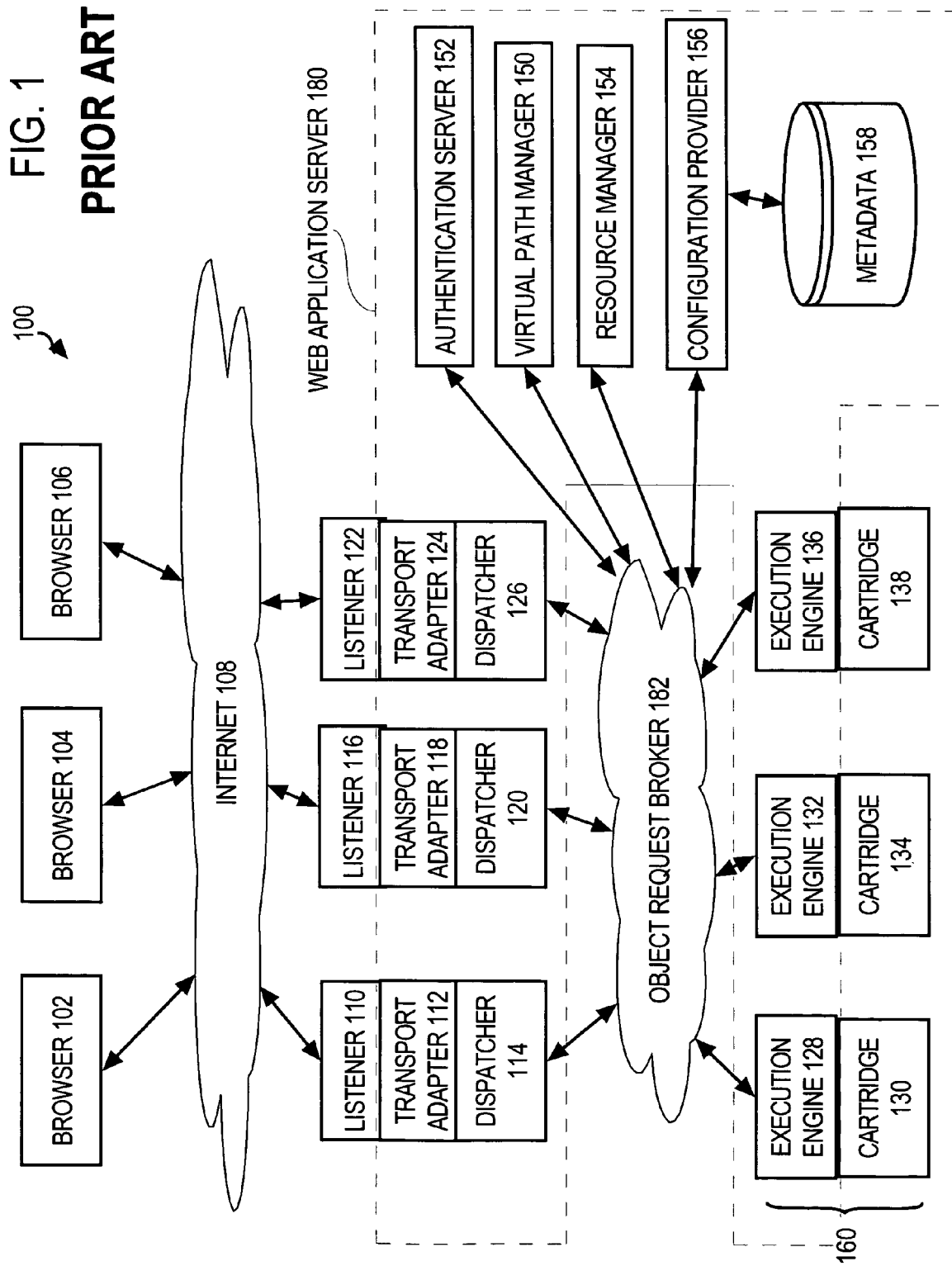
FIG. 1 is a block diagram of an application server system with which embodiment of the invention may be used.
Figure 2:
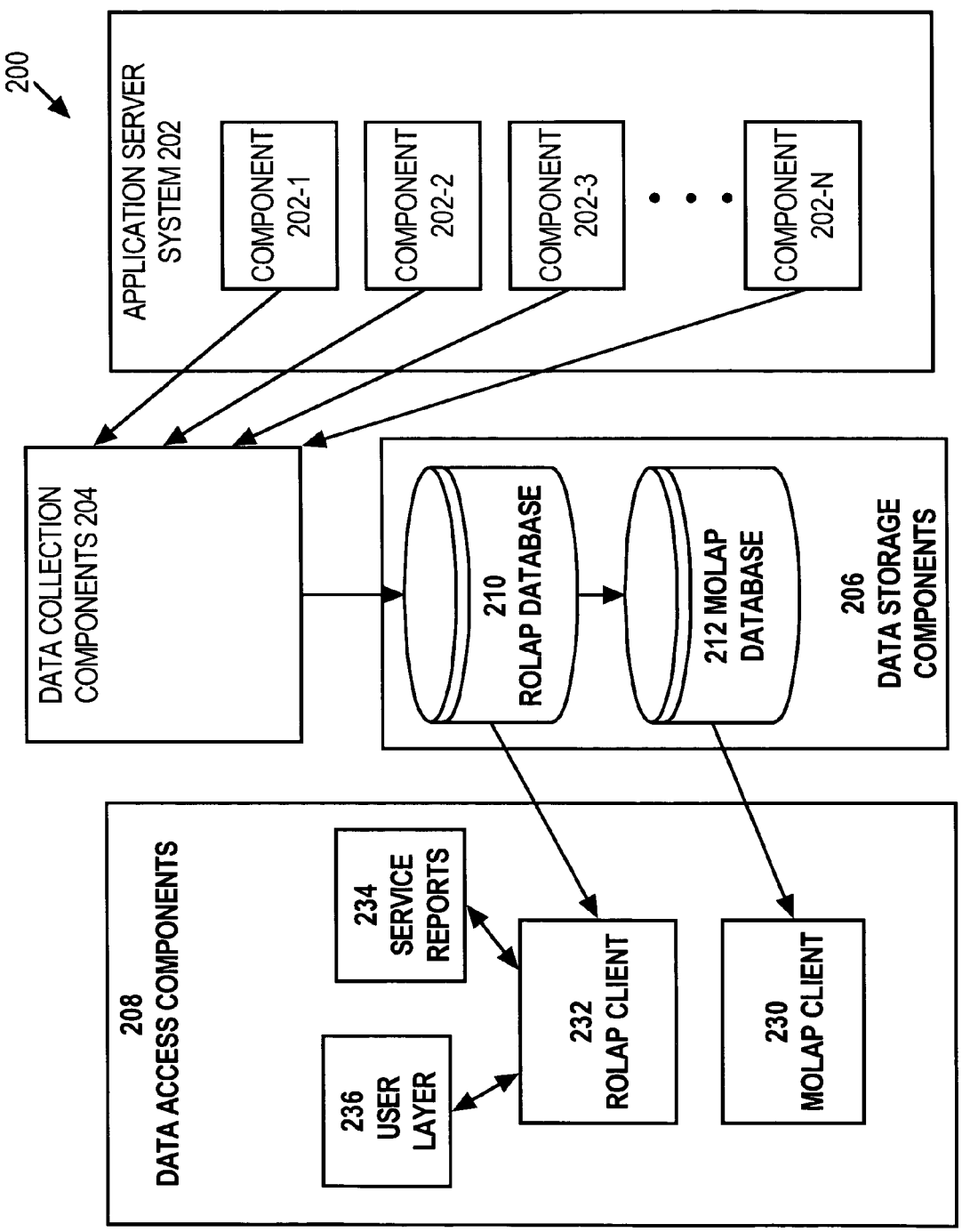
FIG. 2 is a block diagram of a system that may be used to implement the techniques of problem discovery and capacity planning described herein, according to an embodiment of the invention.

FIG. 2 is a block diagram of a system 200 that is configured for performance monitoring, service level troubleshooting, and capacity planning, according to an embodiment of the invention. System 200 generally includes (1) components (202-1 to 202-N) of an application server system 202, (2) data collection components 204 to collect information about the performance of the application server system (hereinafter "performance data"), (3) data storage components 206 to store the performance data, and (4) data access components 108 to access the performance data. As shall be explained hereafter, the data storage components 206 store the performance data in a manner that allows the data access components 208 to be used to easily and efficiently identify service level violations, identify the causes of service level violations, and perform capacity planning.

Application Server System Components

Application server system 202 includes numerous components 202-1 to 202-N. The specific types of and tasks of those components will vary for application server systems from implementation to implementation. In one implementation, system 202 includes a set of concurrent processing servers. A concurrent processing server is a batch processing facility built on the job processing facilities available on the operating system. A concurrent processing server helps execute non-interactive, data dependent programs simultaneously in the background.

Each concurrent processing server, in turn, may include numerous concurrent processing managers. A concurrent processing manager acts as an administrator of job processing and employs workers at the operating system to process application user requests. Each manager can run any program, or be specialized to run only certain kinds of programs. The programs run by a concurrent processing manager are referred to herein as concurrent programs. Concurrent managers continuously read requests from a master queue and run requests based on the requests' schedule, priority and incompatibility rules.

A concurrent program is a program that runs concurrently with other programs as background processes, while the user continues to work at a terminal. Concurrent managers can only take requests to execute concurrent programs. Once a manager picks a request, the manager must obtain information about the job, in order for the job to be executed. According to one embodiment, the information required for concurrent managers to execute a concurrent program is stored in database tables, along with other metadata about the concurrent program.

When a user submits a concurrent request to a concurrent manager, the request is uniquely identified by a request ID. According to one embodiment, the request ID is inserted into a database table, and the table acts as a request queue.

Data Collection Components

Data collection components 204 generally represent components that collect information about how one or more components of system 202 are operating. According to one embodiment, the data collection components 204 retrieve data from many different types of components within application server system 202. The format of the data thus retrieved may vary based on the type of the component from which the data is collected.

According to one embodiment, data collection components 204 include one or more of a "Data Gatherer", "Forms Trace Cartridge", "Apps Cartridge" and "PM2 Cartridge". The Data Gatherer is a multithreaded server process that delivers performance data to requesting clients via IP sockets. The data is collected through collection cartridges that are shareable libraries that reside with the Data Gatherer. The Data Gatherer creates a framework for delivering performance data to client applications in a data driven manner.

The Forms Trace Cartridge, the Apps Cartridge and the PM2 Cartridge are types of collection cartridges. In particular, the Forms Trace Cartridge collects trace statistics for Forms servers. The Apps Cartridge collects database tier statistics for applications by logging into a global schema on the database that keeps a record of the database tier statistics. The PM2 Cartridge collects additional database statistics by, for example, logging into a custom schema which stores additional statistics based on the instrumentation provided through a PM2 toolkit.

Database performance monitor: Many database systems maintain information about their current performance. Typically, databases make this performance data available to users in the form of dynamic performance views. To obtain the current performance information from the database, users can issue queries against the dynamic performance views in the same manner as queries are issued against conventional relational tables. According to one embodiment, a database application, referred to herein as the "database performance monitor", is used to periodically issue queries against the dynamic performance views of the databases used in application server system 202. The data retrieved in response to any given query reflects the performance statistics of the database server at the time the query was issued. Consequently, a historical record of the performance is created by storing each set of query results in a manner that is indexed based on the time the search results were obtained.

Data collected by the data collection components 204 is periodically loaded into data storage components 206. As shall be described in greater detail hereafter, the performance data is organized within the data storage components 206 based on, among other things, the time at which the performance data is generated, collected or loaded.

As mentioned above, data collection components 204 collect data from the various components of the application server system 202. According to one embodiment, the components from which data is collected include the concurrent processing servers, developer server forms, the database server hosting the applications instance, and operating system statistics for the nodes hosting the applications instance.

The data of the concurrent processing server is collected by the Apps Cartridge, which issues SQL commands against the database that is hosting the applications, using the FND tables in the Global Apps Schema. The data of the Developer Server Forms is collected by the Data Gatherer Forms Cartridge to obtain memory/CPU utilization statistics for the various runtime instances of Forms. Related data is also derived through instrumentation of Forms Trace.

The data from the dynamic performance views is collected for the database server that is hosting the applications instance. The Data Gatherer OS Cartridge collects the data of the operating system on the node that is hosting the applications instance. Such information may include, for example, system activity and resource utilization statistics.

Data Storage Components

The performance data collected by data collection components 204 is stored as multidimensional data within storage components 206. In the context of database systems, a "dimension" is a list of values that provide categories for data. A dimension acts as an index for identifying values of a variable. For example, because the performance data has separate values for each time interval, the data has a TIME dimension. That is, the data is organized by TIME. A dimension is similar to a key in a relational database. Data that is organized by two or more dimensions is referred to as "multidimensional data". According to one embodiment, the performance data is organized within data storage components based on TIME, COMPONENT, REQUEST CLASS, and CLIENT.

A hierarchical dimension is a dimension where there is a hierarchical relationship between the values of the dimension. A common example of a hierarchical dimension is time. Possible values for time include a particular day, month, quarter, or year. The values are hierarchically related because a particular day is associated with a particular month, which is associated with a particular quarter, which is associated with a particular year. In addition to the TIME dimension, one or more of the other dimensions used to organize the performance data within data storage components 206 may be hierarchical.

For example, the COMPONENT dimension may have two levels, where a coarser level corresponds to concurrent processing server, and a finer level corresponds to the concurrent managers that correspond to the concurrent processing servers. Similarly, the CLIENT dimension may have the following hierarchical levels: domain name, subnet, and IP address.

Multidimensional data may be stored in relational database systems ("ROLAP" systems) or in specialized, "multidimensional" database systems ("MOLAP" systems). According to one embodiment of the invention, the data storage components 206 used to store the performance data include a ROLAP database 210 and a MOLAP database 212. Multidimensional database systems provide structures and access techniques specifically designed for multidimensional data, and therefore provide relatively efficient storage and access to multidimensional data.

Relational database systems store data in the form of related tables, where each table has one or more columns and zero or more rows. The conventional mechanism for storing multidimensional data in a relational database system is to store the data in tables arranged in what is referred to as a star schema. In relational database systems, a star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are referred to as "fact tables", while the smaller tables are referred to as "dimension tables". Database applications communicate with the relational database system by submitting commands that conform to the database language supported by the relational database system, the most common of which is the Structured Query Language (SQL).

ROLAP database 210 may employ techniques to facilitate the storage and retrieval of multidimensional data. For example, ROLAP database 210 may employ the techniques described in U.S. Pat. No. 6,484,179, entitled "Storing Multidimensional Data In A Relational Database Management System", filed by Raymond Roccaforte on Oct. 25, 1999, the entire contents of which are incorporated herein by this reference.

In an alternative embodiment, ROLAP database 210 is a data warehouse that does not directly receive the performance data from data collection components 204. Rather, data collection components 204 store the performance information into a traditional relational database system. The data is then transferred from the traditional relational database system to ROLAP database 210 on a periodic basis.

Data Access Components

Data access components 208 generally represent tools and applications that are used to analyze and present the performance data stored in data storage components 206. The specific type of application used for the analysis, and the capabilities thereof, will vary from implementation to implementation. In one embodiment, a ROLAP client 232, such as Oracle Discoverer, is used to access and analyze the performance data in ROLAP database 210, and a MOLAP client 230, such as Oracle Express, is used to access and analyze the data in MOLAP database 212.

Data access components 208 may involve more than one layer of software. For example, rather than interact with ROLAP client 232 directly, users may interact with a user layer tool 236 and a service reports tool 234. Those tools, in turn, interact with ROLAP client 232, and ROLAP client 232 interacts with ROLAP database 210. Similarly, system administrators may interact with a Capacity Planning Tool that interacts with MOLAP client 230, which in turn interacts with MOLAP database 212.

According to one embodiment, various views of the performance data are established based on the particular types of users that are interested in the data. For example, separate views of the system performance may be established for backup operators, database operators, and end users. In addition, users may be provided tools to define their own views of the performance data.

The performance data views may be made accessible to users in real time over the Internet. For example, in one embodiment, a customer that has purchased a particular service level can request a particular web page over the Internet. In response to the request, a web page is dynamically generated based on a particular view of the performance data. The data for that view is delivered by ROLAP client 232 based on data retrieved from ROLAP database 210. Further, the view in which the performance data is presented may be selected based on the identity of the user that submitted the request.

By making the views of the performance data available over the Internet to customers of the application server system 202, those users are able to compare the actual level of service they are receiving against the level of service to which they have subscribed. For example, a user may have subscribed to a service level that guarantees a maximum request processing time of 20 seconds. That user may access a view of the performance data that indicates the request processing time for the user. If the request processing time exceeds 20 seconds, then the user knows that its subscription guarantees are not being met.

The tools used to access the performance information preferably support conventional multi-dimensional data access, navigation, and presentation operations, such as those operations commonly referred to as Pivot, Rollup, and Drill Down. When used to process the performance data of application server system 202, these operations allow a user to easily and efficiently identify and isolate the causes of particular types of problems within application server system 202.

System Usage

FIGS. 3-10 illustrate how system 200 may be used to identify and isolate the cause of particular types of problems within application server system 202. Various scenarios are presented hereafter to described how particular problems may be identified by using data access components 208 to navigate through a particular set of performance data. The particular types of performance data collected by data collection components 204 may vary from implementation to implementation. Therefore, the specific types of problems that can be identified, and the specific navigation steps that a user would take to identify the problems, will also vary from implementation to implementation.

Scenario 1

The information collected by data collection components 204 from the concurrent processing managers may include how many long running requests are concurrently running during particular time intervals. FIGS. 3A and 3B illustrate how data access components 208 can be used to navigate through the long running request information to identify the time slots where concurrent processing servers proved to be bottlenecks.

Referring to FIG. 3A, in screen 302 the user is shown the total number of long running requests for all time intervals, all concurrent managers, and all concurrent processing servers. The user then "drills down" one level of the concurrent processing server dimension to show the total number of long running requests separately for each concurrent processing server. The drill down operation produces screen 304.

Based on screen 304, it appears that concurrent processing server CP1 has a significantly higher load than the other concurrent processing servers. Therefore, the user selects CP1 and drills down another level to show the total number of long running requests separately for each concurrent manager within CP1. This drill down operation produces screen 306.

Based on screen 306, it appears that the concurrent manager STDMGR has a significantly higher load than the other concurrent managers of CP1. Therefore, the user selects STDMGR and drills down one level of the time dimension to show the number of long running requests for STDMGR separately for each month. This drill down operation produces screen 308.

Based on screen 308, it appears that, during month MON1, STDMGR had a significantly higher load than during other months. Therefore, the user selects MON1 and drills down one more level of the time dimension to shown the number of long running requests for STDMGR separately for each day within MON1. This drill down operation produces screen 310.

Based on screen 310, it appears that, during day DAY1, STDMGR had a significantly higher load than during other days of month MON1. Therefore, the user selects DAY1 and drills down one more level of the time dimension to shown the number of long running requests for STDMGR separately for each hour within DAY1. This drill down operation produces screen 312. Screen 312 indicates that 30,000 long running requests were active in HR1 of DAY1 of MON1 in STDMGR. Based on this information, the user can attempt to resolve the bottleneck situation. For example, the user can attempt to reschedule some of the requests that are run in that particular time slot to run in other time slots. Alternatively, the user can create a specialized queue for the long running requests. By sending the long running requests to the specialized queue, those requests will not hold up other requests, sent to one or more other queues, during that bottleneck time slot.

Scenario 2

The information collected by data collection components 204 from the concurrent processing servers may include the request run time of particular concurrent programs during particular time intervals. FIGS. 4A and 4B illustrate how data access components 208 can be used to navigate through the request run time information to identify the concurrent program that has the longest request run time and its particular time slot.

Referring to FIG. 4A, in screen 402 the user is shown the total request run time for all time intervals, all concurrent programs, and all concurrent managers. The user then "drills down" one level of the concurrent manager dimension to show the total number of long running requests separately for each concurrent manager. The drill down operation produces screen 404.

Based on screen 404, it appears that requests on concurrent manager CP1 have a significantly higher run time than requests on the other concurrent managers. Therefore, the user selects CP1 and drills down another level to show the request run time separately for each concurrent program within CP1. This drill down operation produces screen 406.

Based on screen 406, it appears that the concurrent program FNDCPURGE has a significantly higher run time than the other concurrent programs of CP1. Therefore, the user selects FNDCPURGE and drills down one level of the time dimension to show the request run time for FNDCPURGE requests within CP1 separately for each month. This drill down operation produces screen 408.

Based on screen 408, it appears that, during month MON1, FNDCPURGE requests had a significantly higher run time than during other months. Therefore, the user selects MON1 and drills down one level of the time dimension to show the request run time for FNDCPURGE requests within CP1 separately for each day within MON1. This drill down operation produces screen 410.

Based on screen 410, it appears that, during DAY1 of month MON1, FNDCPURGE requests had a significantly higher run time than during other days of MON1. Therefore, the user selects DAY1 and drills down one level of the time dimension to show the request run time for FNDCPURGE requests within CP1 separately for each hour within DAY1. This drill down operation produces screen 412.

Based on this information, the user can investigate what peculiar circumstances occurred during that particular time interval with that particular concurrent program, and thereby identify and resolve the causes that led to the high request run times.

Scenario 3

A business user, like 'OE-SUPER', will have a set of "Apps Responsibilities" assigned to him/her. Each Responsibility can issue concurrent requests or initiate Forms Sessions. The load that is generated by adding a business unit could be associated to the Apps Responsibility and is comprised of the Concurrent Manager load and the Forms Sessions load. Scenario 3 involves the use of system 200 for capacity planning for concurrent managers and Forms servers. For example, the question posed by a capacity planner may be: "I have added 2 business units over the past 2 months, what will happen if I add 4 more business units in the next 6 months. FIGS. 5A and 5B illustrate how a planner may navigate through the collected data to answer this question.

Referring to FIG. 5A, it illustrates a screen that indicates the disk usage, memory usage, and CPU usage, for all business units, all Apps Responsibilities, all time intervals, all Apps users, all data servers, all forms servers, and all concurrent processing servers. The planner can select to have the information displayed separately for each business unit, resulting in screen 504. The planner may then drill down to display the information for a particular business unit. Screen 506 is produced when the planner performs a drill down operation based on the FINANCE business unit.

The planner may then perform a drill down operation based on a specific Apps Responsibility of the selected business unit. Screen 508 is produced when a planner performs a drill down operation based on the PO Apps Responsibility. The planner may then compare the resource usage of the PO Apps Responsibility for the FINANCE business unit to the PO Apps Responsibility of other business units during a particular month (MM1). The screen that displays this information to the planner is illustrated as screen 510.

In scenario 3, the planner drills down to the resource consumption for CPU/Memory/Disk along the various dimensions. The planner first drills down along the Business Unit, pivoted it to 'FINANCE' and then drills down along the APPS Responsibility, Time and Apps User Dimensions respectively. The planner then performs a pivot operation to 'PO', 'MM1' and 'FINSUP' and finds the resource consumption for CPU/Memory/Disk.

Scenario 4

Scenario 4 involves performance information maintained for each concurrent program in the application server system 202. Referring to FIG. 6, screen 602 shows the average request times for all concurrent programs, all time intervals, and all execution modes. Screen 604 shows the same information as screen 602, with values shown for each individual concurrent program. Screen 606 shows the same information as screen 604, but only for execution mode "C". Screen 608 illustrates the average request time for a particular concurrent program POPRG1 on a per-day basis.

The user can pivot any of the dimensions and drill down along others to explore the average request times for the various concurrent programs.

Alternatively, a user could drill down to see the requests that ran for a particular concurrent program. Request wait time could be used to see if a particular concurrent program has waited for longer periods than usual. If such has occurred, a user could navigate through the performance data to relate that occurrence with possible causes, such as concurrent processes scheduled for the manager, or availability of the manager during that time interval.

If the wait time is more than the runtime, then the administrator can choose to run those requests in a separate concurrent queue, like a short-running-request queue. Similarly, the administrator could create a queue for long running requests, resulting in an overall throughput improvement in the application server system 202.

Scenario 5

FIG. 7 illustrates screens 702-710 of a scenario in which an Apps database administrator (DBA) pivots along the business unit of his/her choice and drills down along the time axis to find the number of concurrent requests processed in that time slot, for the concurrent program of interest.

In particular, screen 702 shows the number of requests for all time, all business units, and all concurrent programs. The administrator then navigates to screen 704, where the number of requests is shown for individual business units. The administrator then navigates to screen 706, where the number of requests for a particular business unit B1 is shown for each concurrent program. Screen 708 shows the number of requests for a B1 and a particular concurrent program CP1 for individual months. Screen 710 shows the same information for individual days of a selected month MM1.

Scenarios 1-5 demonstrate how application server system management is facilitated by the flexibility obtained by storing the performance data as multidimensional data through which one may navigate using tools that support drill down, roll up, and pivot operations.

Scenario 6

The integration of trace data, forms sessions and Concurrent manager data into a multidimensional repository facilitates End to End Management for Applications. Service Level triggers along the Service level parameters in the Multidimensional repository facilitate Service Level Violation Reporting and fits well into a Service Level Management framework.

FIG. 8 illustrates a series of screens that may be presented to an end user in response to navigation commands sent by the end user to navigate through the performance data generated for a particular session of the user.

Screen 802 shows the NCA Client time, Apps Server time and DB Server time for all time intervals, all NCA clients, all Apps servers and all DB servers. Screen 804 shows the same information as screen 802, with the separate values shown for each Apps server. Screen 806 shows the NCA Client time, Apps Server time and DB Server time for the SALES Apps Server for particular time intervals. Screen 808 shows the NCA Client time, Apps Server time and DB Server time for the SALES Apps server for particular intervals for particular DB Servers. Screen 810 shows the NCA Client time, Apps Server time and DB Server time for particular time intervals, particular NCA Clients, a particular Apps Server, and a particular DB server.

Combining the network latencies with the processing times of the database and the application servers provides a comprehensive view of the end-to-end performance metrics for the end user.

Scenario 7

FIG. 9 illustrates a series of screens that may be presented in response to navigation commands sent by a user to identify the source of a Service Level Agreement (SLA) violation. An SLA violation is a condition or set of conditions that causes one or more guarantees in a Service Level Agreement to be broken. In scenario 7, the user is notified of an error by a monitor previously registered by the user. The drills down to a specific concurrent request, and the SQL database command that generated an error. In the illustrated scenario, the user determines that the error was caused because the SQL command did not include the correct number of arguments.

In particular, screen 902 presents information related to the SLA violation. Screen 904 shows the number of concurrent requests for all concurrent programs, all concurrent managers, and all modes of completion. Screen 906 illustrates the same information for each mode of completion. Screen 908 shows the same information for all concurrent programs where completion status is "Error", and where separate values are shown for each concurrent manager. Screen 910 illustrates the error occurrences that occurred in the POXCON concurrent manager, the PL/SQL blocks that caused the errors, and the request times of the errors.

Scenario 8

FIG. 10 illustrates a series of screens that may be presented in response to navigation commands sent by a user. In scenario 8, a user pivots the Apps User in which the user is interested (VISION in this case) and does a drill down along the Database User Dimension. The user pivots the Database User (APPS in this case) and does a drill down along the Forms/Database session to find the Forms Client time, Forms Server time, the Database Execution time and the Network Latency time In particular, at screen 1002, the DB time, Forms Server time, and Forms Client time are shown for all forms sessions, all database sessions, all Apps users and all database users. Screen 1004 shows the same information, with different values shown for each Apps user. Screen 1006 shows the same information for each database user of the VISION Apps user. Screen 1008 shows the same information for each database session for the APPS database user associated with the VISION Apps user.

Snapshot Comparisons

As mentioned above, performance data is periodically loaded into data storage components 206. Within data storage components 206, the performance data is organized, among other things, based on time. The performance data that is associated with a particular time or time interval can be considered a "snapshot" of the performance of application server system 202 at that particular time. According to one embodiment, one of the snapshots is selected as a "baseline snapshot". Preferably, the snapshot that is selected as the baseline snapshot is a snapshot that reflects the performance of application server system 202 during an interval in which all user service level guarantees are met.

According to one embodiment, the baseline snapshot is compared to subsequent snapshots. The comparison may be performed, for example, at the time the subsequent snapshots are loaded into data storage components 206. If the deviation between the baseline snapshot and the subsequent snapshot does not exceed a certain threshold, then no action is taken. However, if the deviation between the baseline snapshot and the subsequent snapshot exceeds the threshold, then corrective action is taken. Corrective action may include, for example, sending a message to an administrator of application server system 202 to alert the administrator to the possibility of a performance problem. Alternatively, if the deviation indicates violation of the service level agreements of one or more customers, the corrective action may include compensating the customers for the violation and/or sending messages to inform the customers about the violation.

The operation of comparing snapshots may consume a significant amount of resources, depending on the size of the application server system 202 and the amount of performance data collected. Therefore, according to one embodiment, every snapshot is not automatically compared to the baseline snapshot. Rather, snapshots are selected for comparison based on some criteria such as, for example, the passage of a time interval from the time of the last snapshot comparison.

Service Level Violation Reporting

Many database systems support triggers. Triggers allow a user to specify an action to be performed by the database system in response to a particular event. According to one embodiment, triggers are defined to fire when performance data indicates that a service level is violated. The action performed by the trigger may be, for example, the generation of a service level violation report. Such a report may be automatically sent to both the application server administrator and the customer whose service level was violated.

Hardware Overview

Figure 11:
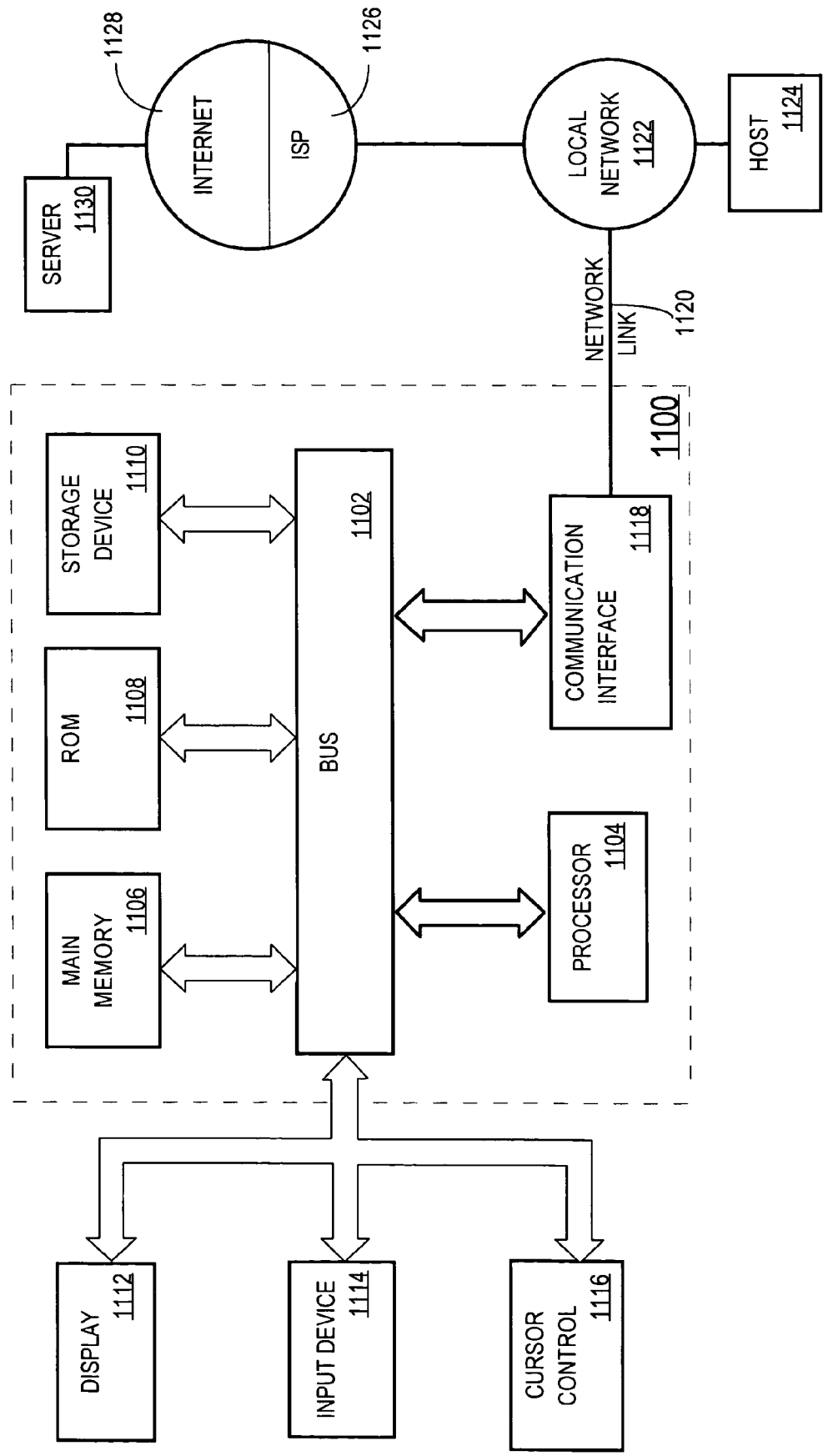
FIG. 11 is a block diagram of a computer system that may be used to implement embodiments of the invention.

FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for implementing the techniques described herein. According to one embodiment of the invention, those techniques are implemented by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. In accordance with the invention, one such downloaded application implements the techniques described herein.

The received code may be executed by processor 1104 as it is received, and/or stored in storage device 1110, or other non-volatile storage for later execution. In this manner, computer system 1100 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method, comprising the steps of:
   sampling operational characteristics of a component to obtain data reflecting performance of the component;
   storing the data into a storage according to an organization including at least a time dimension and a component dimension;
   wherein the time dimension is a list of time intervals that comprises first time intervals that correspond to a coarser level of granularity and second time intervals that correspond to a finer level of granularity, wherein the first time intervals correspond to longer time periods than the second time intervals;
   wherein each time interval of the first time intervals corresponds to a plurality of the second time intervals;
   wherein all of the second time intervals have a same fixed length;
   wherein the time dimension is a hierarchical dimension in which the first time intervals and the second time intervals have a hierarchical relationship with respect to each other;
   wherein the component dimension is a list of values that comprises first values that correspond to a coarser level of component granularity and second values that correspond to a finer level of component granularity, wherein the first values correspond to first component elements that include second component elements corresponding to the second values:
   wherein each value of the first values corresponds to a plurality of the second values:
   wherein the component dimension is a hierarchical dimension in which the first values and the second values have a hierarchical relationship with respect to each other; and
   performing an operation on the data in the storage, wherein the operation is one of a drill down operation that involves transforming the data at the coarser level of granularity to the data at the finer level of granularity, or a rollup operation that involves transforming the data at the finer level of granularity to the data at the coarser level of granularity;

wherein performing the operation on the data in the storage further comprises performing one of a drill down operation that involves transforming the data at the coarser level of component granularity to the data at the finer level of component granularity, or a rollup operation that involves transforming the data at the finer level of component granularity to the data at the coarser level of component granularity;

wherein the steps of the method are performed by one or more computing devices.

2. A computer implemented method as recited in claim 1, wherein the step of sampling operational characteristics of the component to obtain data reflecting performance of the component further comprises the step of:

making a measurement dataspace sample at a time t1.

3. A computer implemented method as recited in claim 1, wherein the step of storing the data into a storage according to an organization including at least a time dimension and a component dimension further comprises the steps of:

comparing a first measurement dataspace sampled at a time t1 with a second measurement dataspace sampled at a time t2, and if the second measurement dataspace deviates from the first measurement dataspace by a deviation threshold, generating a report.

4. A computer implemented method as recited in claim 1, wherein the step of performing the operation on the data in the storage further comprises the steps of:

comparing a first measurement dataspace sampled at a time t1 with a second measurement dataspace sampled at a time t2, and if the second measurement dataspace deviates from the first measurement dataspace by a deviation threshold, generating a report.

5. A computer implemented method as recited in claim 1, further comprising the step of:

dynamically generating a web page comprising a particular view of performance data responsive to a request.

6. A computer implemented method as recited in claim 1, further comprising the steps of:

comparing a measurement dataspace sampled at a time of processing a request with a level of service, and if the measurement dataspace deviates from the level of service by a deviation threshold, confirming that a subscription guarantee is not met.

7. A computer readable storage medium storing one or more sequences of instructions which instructions, when executed by one or more processors, cause the one or more processors to carry out the steps of:

sampling operational characteristics of a component to obtain data reflecting performance of the component;

storing the data into a storage according to an organization including at least a time dimension and a component dimension;

wherein the time dimension is a list of time intervals that comprises first time intervals that correspond to a coarser level of granularity and second time intervals that correspond to a finer level of granularity, wherein the first time intervals correspond to longer time periods than the second time intervals;

wherein each time interval of the first time intervals corresponds to a plurality of the second time intervals;

wherein all of the second time intervals have a same fixed length;

wherein the time dimension is a hierarchical dimension in which the first time intervals and the second time intervals have a hierarchical relationship with respect to each other;

wherein the component dimension is a list of values that comprises first values that correspond to a coarser level of component granularity and second values that correspond to a finer level of component granularity, wherein the first values correspond to first component elements that include second component elements corresponding to the second values;

wherein each value of the first values corresponds to a plurality of the second values;

wherein the component dimension is a hierarchical dimension in which the first values and the second values have a hierarchical relationship with respect to each other; and performing an operation on the data in the storage, wherein the operation is one of a drill down operation that involves transforming the data at the coarser level of granularity to the data at the finer level of granularity, or a rollup operation that involves transforming the data at the finer level of granularity to the data at the coarser level of granularity;

wherein performing the operation on the data in the storage further comprises performing one of a drill down operation that involves transforming the data at the coarser level of component granularity to the data at the finer level of component granularity, or a rollup operation that involves transforming the data at the finer level of component granularity to the data at the coarser level of component granularity.

8. A computer readable storage medium as recited in claim 7, wherein the instructions for carrying out the step of sampling operational characteristics of the component to obtain data reflecting performance of the component further comprises instructions for carrying out the step of: making a measurement dataspace sample at a time t1.

9. A computer readable storage medium as recited in claim 7, wherein the instructions for carrying out the step of storing the data into a storage according to an organization including at least a time dimension and a component dimension further comprises instructions for carrying out the step of:

comparing a first measurement dataspace sampled at a time t1 with a second measurement dataspace sampled at a time t2, and if the second measurement dataspace deviates from the first measurement dataspace by a deviation threshold, generating a report.

10. A computer readable storage medium as recited in claim 7, wherein the instructions for carrying out the step of performing the operation on the data in the storage further comprises instructions for carrying out the step of:

comparing a first measurement dataspace sampled at a time t1 with a second measurement dataspace sampled at a time t2, and if the second measurement dataspace deviates from the first measurement dataspace by a deviation threshold, generating a report.

11. A computer readable storage medium as recited in claim 7, further comprising instructions for carrying out the step of:

dynamically generating a web page comprising a particular view of performance data responsive to a request.

12. A computer readable storage medium as recited in claim 7, further comprising instructions for carrying out the step of:

comparing a measurement dataspace sampled at a time of processing a request with a level of service, and if the measurement dataspace deviates from the level of service by a deviation threshold, confirming that a subscription guarantee is not met.

13. An apparatus comprising:
a processor;
a memory, connected to the processor by a bus; and
one or more stored sequences of instructions which, when executed by the processor, cause the processor to carry out the steps of:
sampling operational characteristics of a component to obtain data reflecting performance of the component;
storing the data into a storage according to an organization including at least a time dimension and a component dimension;
wherein the time dimension is a list of time intervals that comprises first time intervals that correspond to a coarser level of granularity and second time intervals that correspond to a finer level of granularity, wherein the first time intervals correspond to longer time periods than the second time intervals;
wherein each time interval of the first time intervals corresponds to a plurality of the second time intervals;
wherein all of the second time intervals have a same fixed length;
wherein the time dimension is a hierarchical dimension in which the first time intervals and the second time intervals have a hierarchical relationship with respect to each other;
wherein the component dimension is a list of values that comprises first values that correspond to a coarser level of component granularity and second values that correspond to a finer level of component granularity, wherein the first values correspond to first component elements that include second component elements corresponding to the second values;
wherein each value of the first values corresponds to a plurality of the second values;
wherein the component dimension is a hierarchical dimension in which the first values and the second values have a hierarchical relationship with respect to each other; and
performing an operation on the data in the storage, wherein the operation is one of a drill down operation that involves transforming the data at the coarser level of granularity to the data at the finer level of granularity, or a rollup operation that involves transforming the data at the finer level of granularity to the data at the coarser level of granularity;
wherein performing the operation on the data in the storage further comprises performing one of a drill down operation that involves transforming the data at the coarser level of component granularity to the data at the finer level of component granularity, or a rollup operation that involves transforming the data at the finer level of component granularity to the data at the coarser level of component granularity.

14. An apparatus as recited in claim 13, wherein the instructions for carrying out the step of sampling operational characteristics of the component to obtain data reflecting performance of the component further comprises instructions for carrying out the step of:
making a measurement dataspace sample at a time t1.

15. An apparatus as recited in claim 13, wherein the instructions for carrying out the step of storing the data into a storage according to an organization including at least a time dimension and a component dimension further comprises instructions for carrying out the step of:

comparing a first measurement dataspace sampled at a time t1 with a second measurement dataspace sampled at a time t2, and if the second measurement dataspace deviates from the first measurement dataspace by a deviation threshold, generating a report.

16. An apparatus as recited in claim 13, wherein the instructions for carrying out the step of performing the operation on the data in the storage further comprises instructions for carrying out the step of:
comparing a first measurement dataspace sampled at a time t1 with a second measurement dataspace sampled at a time t2, and if the second measurement dataspace deviates from the first measurement dataspace by a deviation threshold, generating a report.

17. An apparatus as recited in claim 13, further comprising instructions for carrying out the step of:
dynamically generating a web page comprising a particular view of performance data responsive to a request.

18. An apparatus as recited in claim 13, further comprising instructions for carrying out the step of:
comparing a measurement dataspace sampled at a time of processing a request with a level of service, and if the measurement dataspace deviates from the level of service by a deviation threshold, confirming that a subscription guarantee is not met.

19. An apparatus, comprising:
a mechanism for sampling operational characteristics of a component hosting at least one application to obtain data reflecting performance of the component;
a mechanism for storing the data into a storage according to an organization including at least a time dimension and a component dimension;
wherein the time dimension is a list of time intervals that comprises first time intervals that correspond to a coarser level of granularity and second time intervals that correspond to a finer level of granularity, wherein the first time intervals correspond to longer time periods than the second time intervals;
wherein each time interval of the first time intervals corresponds to a plurality of the second time intervals;
wherein all of the second time intervals have a same fixed length;
wherein the time dimension is a hierarchical dimension in which the first time intervals and the second time intervals have a hierarchical relationship with respect to each other;
wherein the component dimension is a list of values that comprises first values that correspond to a coarser level of component granularity and second values that correspond to a finer level of component granularity, wherein the first values correspond to first component elements that include second component elements corresponding to the second values;
wherein each value of the first values corresponds to a plurality of the second values;
wherein the component dimension is a hierarchical dimension in which the first values and the second values have a hierarchical relationship with respect to each other; and
a mechanism for performing an operation on the data in the storage, wherein the operation is one of a drill down operation that involves transforming the data at the coarser level of granularity to the data at the finer level of granularity, or a rollup operation that involves transforming the data at the finer level of granularity to the data at the coarser level of granularity;

wherein the mechanism for performing the operation on the data in the storage further comprises a mechanism for performing one of a drill down operation that involves transforming the data at the coarser level of component granularity to the data at the finer level of component granularity, or a rollup operation that involves transforming the data at the finer level of component granularity to the data at the coarser level of component granularity.

20. A system, comprising:
an application server system that includes a set of application server components that host at least one application;
data collection components operatively coupled to the set of application server components, wherein the data collection components sample operational characteristics of an application server component to obtain data reflecting performance of the component, and wherein the performance data includes at least one measure that reflects performance of the application server component;
data storage components for storing the data according to an organization including at least a time dimension and a component dimension;
wherein the time dimension is a list of time intervals that comprises first time intervals that correspond to a coarser level of granularity and second time intervals that correspond to a finer level of granularity, wherein the first time intervals correspond to longer time periods than the second time intervals;
wherein each time interval of the first time intervals corresponds to a plurality of the second time intervals;
wherein all of the second time intervals have a same fixed length;
wherein the time dimension is a hierarchical dimension in which the first time intervals and the second time intervals have a hierarchical relationship with respect to each other;
wherein the component dimension is a list of values that comprises first values that correspond to a coarser level of component granularity and second values that correspond to a finer level of component granularity, wherein the first values correspond to first component elements that include second component elements corresponding to the second values;
wherein each value of the first values corresponds to a plurality of the second values;
wherein the component dimension is a hierarchical dimension in which the first values and the second values have a hierarchical relationship with respect to each other; and
data access components operatively coupled to the data storage components for retrieving the data and performing an operation on the data in the storage, wherein the operation is one of a drill down operation that involves transforming the data at the coarser level of granularity to the data at the finer level of granularity, or a rollup operation that involves transforming the data at the finer level of granularity to the data at the coarser level of granularity;
wherein performing the operation on the data in the storage further comprises performing one of a drill down operation that involves transforming the data at the coarser level of component granularity to the data at the finer level of component granularity, or a rollup operation that involves transforming the data at the finer level of component granularity to the data at the coarser level of component granularity.

21. A computer implemented method as recited in claim 1, wherein the component hosts at least one application.

22. A computer implemented method as recited in claim 1, wherein the operation on the data is the drill down operation.

23. A computer implemented method as recited in claim 1, further comprising performing a pivot operation on the data in the storage.

24. A computer implemented method as recited in claim 1, wherein the operation on the data is the rollup operation.

25. A computer readable storage medium as recited in claim 7, wherein the component hosts at least one application.

26. A computer readable storage medium as recited in claim 7, wherein the operation on the data is the drill down operation.

27. A computer readable storage medium as recited in claim 7, wherein the one or more sequences of instructions further comprise instructions which, when executed by the one or more processors, cause the one or more processors to carry out the step of performing a pivot operation on the data in the storage.

28. A computer readable storage medium as recited in claim 7, wherein the operation on the data is the rollup operation.

29. An apparatus as recited in claim 13, wherein the component hosts at least one application.

30. An apparatus as recited in claim 13, wherein the operation on the data is the drill down operation.

31. An apparatus as recited in claim 13, wherein the one or more stored sequences of instructions further comprise instructions which, when executed by the one or more processors, cause the one or more processors to carry out the step of performing a pivot operation on the data in the storage.

32. An apparatus as recited in claim 13, wherein the operation on the data is the rollup operation.

* * * * *

UNITED STATES PATENT AND TRADEMARK OFFICE
CERTIFICATE OF CORRECTION

PATENT NO. : 7,617,312 B2  Page 1 of 1
APPLICATION NO. : 10/871074
DATED : November 10, 2009
INVENTOR(S) : Venkat Ranga Reddy Tummalapalli It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 599 days.

should read (*) Notice: Subject to any disclaimer, the term of this patent is extended or adjusted under 35 U.S.C. 154(b) by 971 days.

In column 9, line 28, delete "described" and insert -- describe --, therefor.

In column 13, line 36, after "time" insert -- . --.

In column 16, line 58, in claim 1, delete "values:" and insert -- values; --, therefor.

In column 16, line 60, in claim 1, delete "values:" and insert -- values; --, therefor.

Signed and Sealed this

Third Day of August, 2010

David J. Kappos
*Director of the United States Patent and Trademark Office*